T. SHAW.
Paddle-Wheels.
No. 133,341. Patented Nov. 26, 1872.
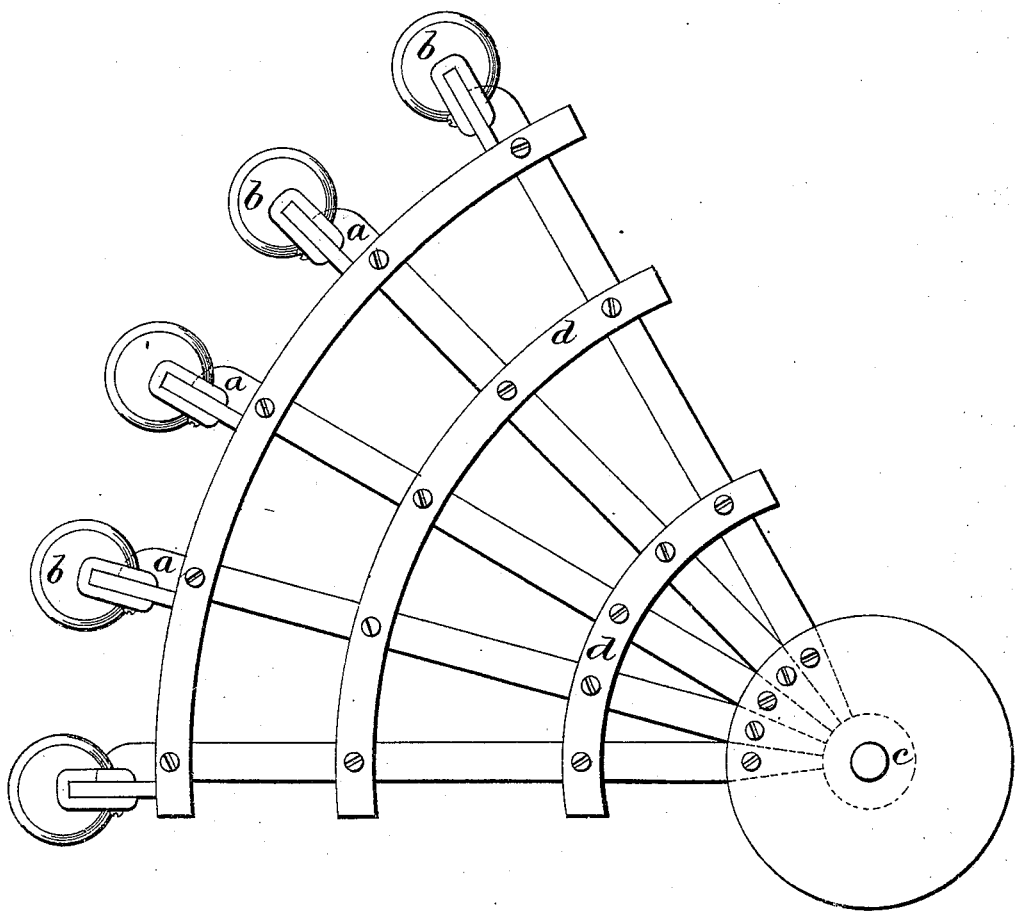
Witnesses.
Hector Orr.
James Keenan.
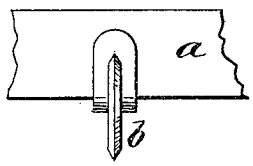
Inventor.
Thomas Shaw.

UNITED STATES PATENT OFFICE.

THOMAS SHAW, OF PHILADELPHIA, PENNSYLVANIA.

IMPROVEMENT IN PADDLE-WHEELS.

Specification forming part of Letters Patent No. 133,341, dated November 26, 1872.

*To all whom it may concern:*

Be it known that I, THOMAS SHAW, of the city and county of Philadelphia, Pennsylvania, have invented a new and Improved Mode of Preventing the Destruction of Paddle-Wheels by Fields of Ice; and I hereby declare the following to be a full, clear, and exact description of the same, reference being had to the accompanying drawing and to the letters of reference marked thereon.

My invention consists in the securing of semicircular disks of steel to the paddles of steamboat-wheels, in the manner and for the purpose as hereafter described. The object of the invention is to cut the ice in several places throughout the length of paddle, that the cakes of ice may be reduced in size before they are touched by the paddle, as hereafter described.

In order to enable others to use and practice my invention, I will proceed to describe its construction and operation.

On reference to the accompanying drawing which forms part of the specification, the sketch represents a face view of section of paddle-wheel, of which $c$ is the axle and hub, and $d$ the hoop that unites arms projecting from hub, and $a$ the paddles, to which are secured the disks $b$ for cutting the ice, as hereafter described.

When the paddle-wheel is rotating and approaching a field of ice, the disks $b$ operate as so many axes to split the ice into narrow sections, whereby the mass of ice is so far reduced that the resulting fragments will not injuriously affect the paddle-wheels.

What I claim, and desire to secure by Letters Patent, is—

The combination of the metallic disks $b$ with paddles $a$, substantially as and for the purpose set forth.

THOMAS SHAW.

Witnesses:
   HECTOR ORR,
   JAMES KEENAN.